United States Patent

Robinson, Jr. et al.

[11] Patent Number: 5,309,644
[45] Date of Patent: May 10, 1994

[54] SEWER INVERT ELEVATION MEASURING INSTRUMENT

[76] Inventors: Samuel P. Robinson, Jr., 400 NW. 214th St., No. 104, Miami, Fla. 33169; Lionel G. Heroux, 1711 SW. 95th Ter., Miramar, Fla. 33025

[21] Appl. No.: 978,489

[22] Filed: Nov. 18, 1992

[51] Int. Cl.$^5$ .................................. G01C 15/00
[52] U.S. Cl. ...................................... 33/293; 33/1 H; 33/836; 33/832
[58] Field of Search ............... 33/1 H, 290, 291, 292, 33/293, 294, 295, 296, 286, 529, 713, 719, 836

[56] References Cited

U.S. PATENT DOCUMENTS

| | | | |
|---|---|---|---|
| 2,624,950 | 1/1953 | Mitchell | 33/529 |
| 2,701,419 | 2/1955 | Des Voignes | 33/836 |
| 3,130,495 | 4/1964 | Schultz | 33/1 H |
| 3,307,264 | 3/1967 | Wolfe | 33/292 |
| 3,314,068 | 4/1967 | Verive | 33/293 |
| 3,591,926 | 7/1971 | Trice, Jr. | 33/1 H |
| 3,879,132 | 4/1975 | Myeress | 33/1 H |
| 3,922,921 | 12/1975 | Woo | 33/354 |
| 4,364,175 | 12/1982 | Levake et al. | 33/1 H |
| 4,674,188 | 6/1987 | Fisher | 33/1 H |
| 4,803,784 | 2/1989 | Miller | 33/293 |
| 4,879,816 | 11/1989 | Sierk | 33/295 |
| 4,993,160 | 2/1991 | Fraley | 33/293 |

*Primary Examiner*—William A. Cuchlinski, Jr.
*Assistant Examiner*—G. Bradley Bennett
*Attorney, Agent, or Firm*—Alvin S. Blum

[57] ABSTRACT

An instrument and method for measuring the invert of a sewer pipe relative to a manhole employs a horizontal bar which spans the manhole and rests upon its rim. A sight rod is slideably mounted on a sleeve fixed to the bar. The sleeve has adjustments for mounting the bar in true vertical and plumb position with a spirit level. Removably connected to the lower end of the rod is an arm which extends laterally and below the rod at its distal end. The rod is lowered until the distal end of the arm contacts the invert of the pipe. The vertical distance between the bottom of the arm at contact with the invert and the intersection of the rod with the bottom of the horizontal bar yields the desired elevation. It may be read directly off the sight rod when the rod is specially marked with corrected graduations.

10 Claims, 2 Drawing Sheets

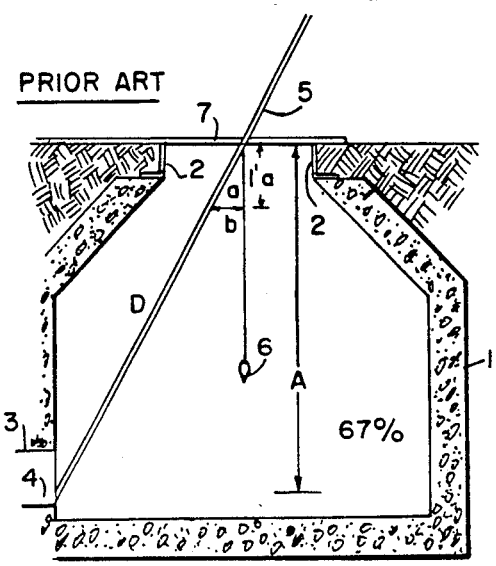
PRIOR ART
FIG. 1
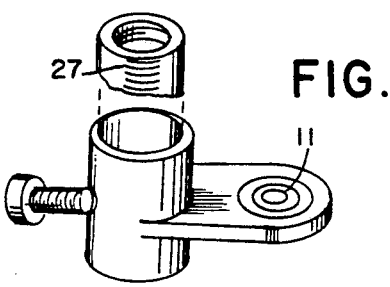
FIG. 3
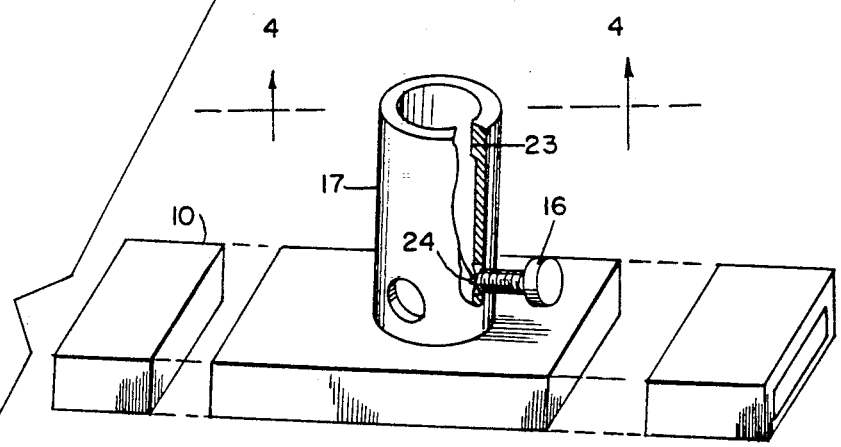
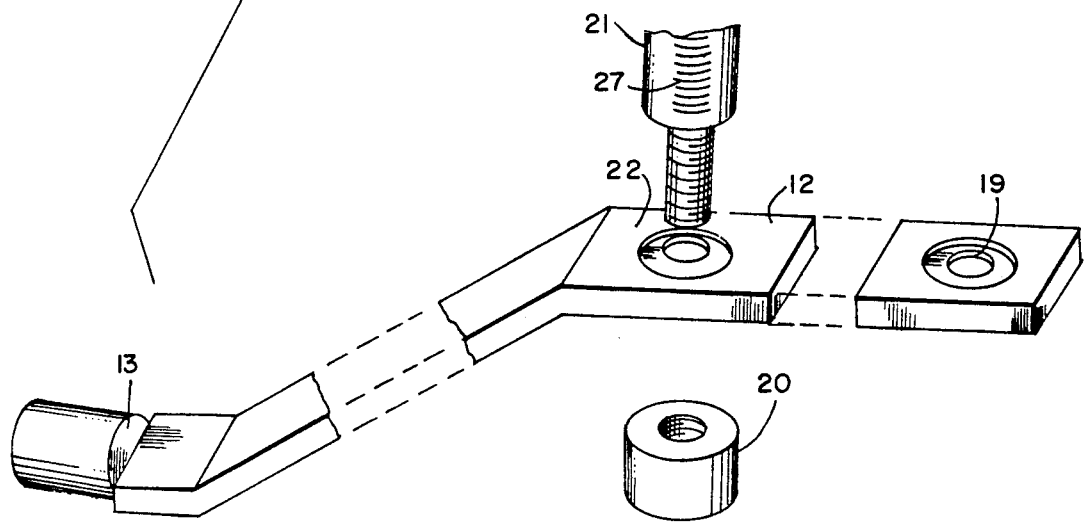

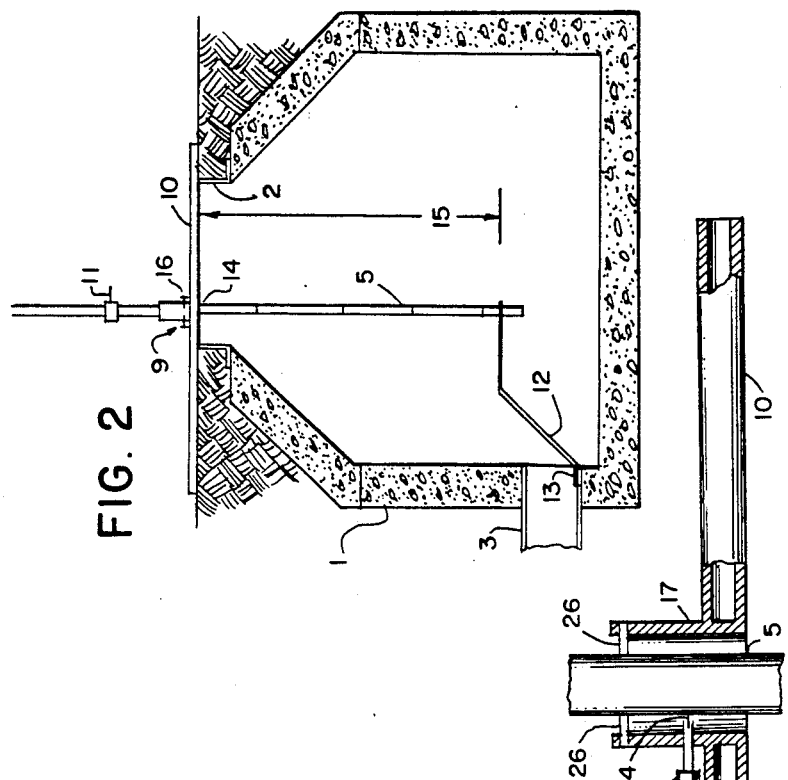
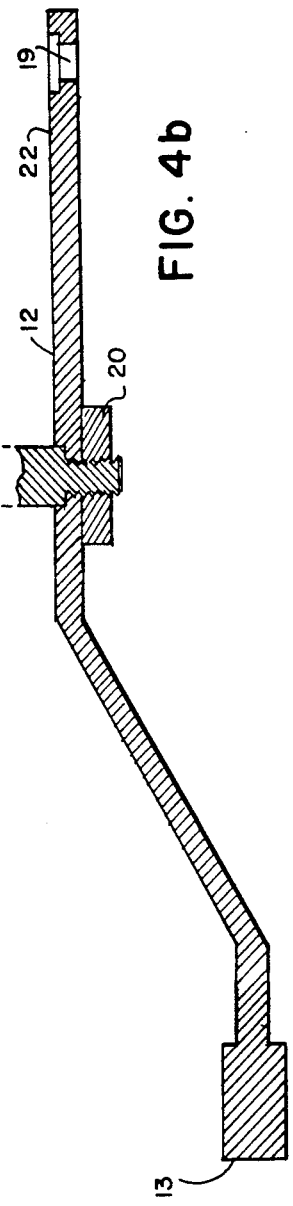
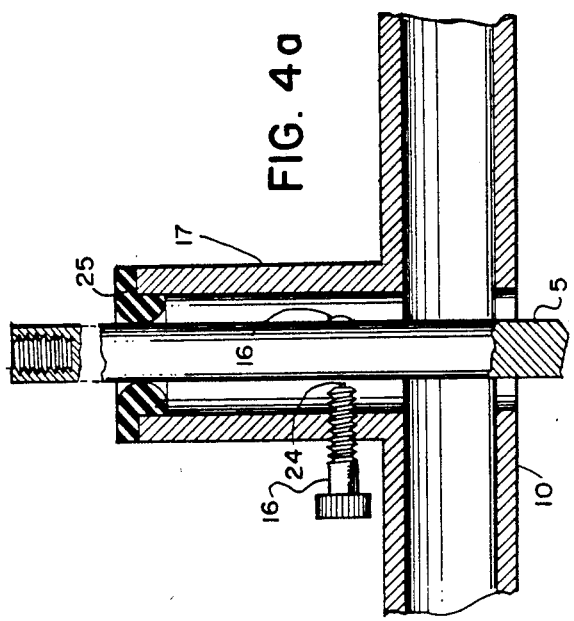

SEWER INVERT ELEVATION MEASURING INSTRUMENT

BACKGROUND OF THE INVENTION

This invention relates to surveying instruments and more particularly to an instrument for measuring the elevation of sewer pipes relative to manholes, to determine the flow line.

When surveying sewer lines, it is necessary to determine the elevation of the sewer pipes where they enter the box union. The vertical distance from the lowest point of the interior of the pipe, or "invert", to the upper edge of the manhole frame at the top of the box is currently measured by an awkward and labor intensive procedure. Surveying a sewer line requires making this measurement frequently at considerable cost. The measurement is critical in certifying that proper slope is maintained for drainage. Because the measurement is so awkward, it is subject to considerable error.

SUMMARY OF THE INVENTION

It is accordingly an object of the invention to provide an instrument which makes it possible for a single operator to make the measurement of invert elevation with speed and accuracy. It is another object to provide such a device that is light in weight, durable, and readily packed away for transport and storage.

The instrument of the invention comprises a horizontal bar to lay across the top of the rim of the manhole. Affixed to the bar, and passing through it, is a vertical sleeve. The sleeve has an inner diameter great enough to freely pass a surveyor's sight rod. Arranged at the upper end of the sleeve is a bushing sized to make a closer fit to the sight rod. Disposed about the sleeve at a lower level are a set of radially positioned adjustment screws for adjusting the vertical position of the rod until it is plumb. A spirit level clamped on the sight rod provides visual indication of the true vertical position of the rod while supported on the manhole. An invert-contacting member is removably attached to the lower end of the sight rod. It extends laterally and downward. The rod is adjusted vertically until the distal end of the member contacts the invert, and the elevation of the invert relative to the manhole is read off the rod.

These and other objects, advantages and features of the invention will become more apparent when the detailed description is studied in conjunction with the drawings.

BRIEF DESCRIPTION OF THE DRAWINGS

FIG. 1 is a diagrammatic illustration of the measuring technique of the prior art.

FIG. 2 is a diagrammatic illustration of the measuring technique with the instrument of the invention.

FIG. 4 is an exploded perspective view of the instrument of the invention with portions broken away.

FIG. 4a is a sectional view taken through line 4—4 of FIG. 3.

FIG. 4b is a sectional view taken through line 4—4 of FIG. 3 of an alternative structure.

DETAILED DESCRIPTION OF PREFERRED EMBODIMENTS OF THE INVENTION

Referring now first to FIG. 1, a typical union box 1 with a manhole 2 is shown with a pipe 3 entering it. The task for the surveyor is to measure the vertical distance A from the upper edge of the manhole 2 to the invert 4, the lowest point of the inside of pipe 3. A typical procedure is to extend a surveyor's sight rod 5 down to contact the invert. A plumb bob 6 is dropped from a bar 7 resting on the rim of the manhole at the sight rod. One foot down the plumb line, the horizontal distance b to the rod is measured. Knowing the two sides a and b of the smaller right triangle, its hypotenuse is calculated. Since the hypotenuse D of the larger triangle is known by measurement, the leg A of that triangle is readily calculated. The procedure is awkward and subject to error. At least two persons and often three are employed to make this measurement.

Referring now to FIG. 2, the measuring instrument 9 of the invention is shown in operation at a box union 1. It comprises a horizontal bar 10 for resting upon the upper rim of the manhole 2. Permanently affixed to the bar 10 is a vertical sleeve 17 slidably receiving a surveyor's sight rod 5. Clamped to the sight rod is a bubble level 11 of the bullseye type for ensuring that the rod 5 is plumb. Clamped to the lower end of the sight rod is a lateral arm 12 which extends downward and laterally. At its distal end is a cylindrical bar 13 which serves as a contact point for contacting the inside diameter of the pipe 3 at its lowest point, known in the art as the invert. The distance from the lowest measuring point of the rod 5 to the bottom of the contact point is fixed at one foot. Measuring the distance 15 from the bottom of the rod 5 to the point of intersection 14 gives the elevation minus one foot. To be certain that this is a true vertical measurement, the rod 5 is first adjusted to be plumb by use of the level 11 in conjunction with three adjusting screws 16 arranged in a circle on the vertical sleeve 17.

FIGS. 3, 4a and 4b show in greater detail the structure of the measuring instrument 9. The instrument is arranged to be readily assembled for use and then disassembled for transport and storage in a compact configuration. The lateral arm 12 is provided with two alternate attaching holes 19 for adjusting the lateral extent of the arm. The holes are recessed to receive the sight rod 5 and, when secured by nut 20, hold the arm 12 orthogonally against the rod 5. Ordinary jointed sight rod segments 5 may be used.

Alternatively, the sight rod may include a special segment 21 that is graduated with markings so as to include the distance from the top 22 of the lateral arm to the bottom of the cylindrical contact point 13. If the elevation is to be read off at the top of vertical sleeve 17, markings 27 are adjusted by subtraction of the distance between the top of sleeve 17 and the bottom of horizontal bar 10.

The arrangement for adjusting the rod to be plumb when the horizontal bar 10 is resting on the manhole 2 includes a reduced diameter upper portion 23 of sleeve 17 and three adjusting screws 16 arranged in a lower plane on the sleeve. The adjusting screws 16 are provided with spring-loaded plunger tips 24 to provide a limited force grip on the sight rod when finally adjusted to be plumb with use of the clamp-on level 11. The reduced diameter upper portion 23 of the sleeve may be integral with the rigid sleeve 17 as in FIG. 3 or provided as a grommet or bushing 25 as shown in FIG. 4a. This may be formed of a resilient material. Alternatively, as shown in FIG. 4b, the bushing may be replaced by a ring of inwardly directed pins 26 arranged in an upper plane. The pins may be resilient or provided with spring-loaded tips for releasably engaging the rod 5.

The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A surveying instrument for measuring the elevation of the invert of a sewer pipe relative to the top of a manhole, the instrument comprising:
   A) elongate horizontal bar means for extending diametrally across a manhole and resting upon the upper rim diameter thereof, said bar means having a long axis;
   B) vertical sleeve means rigidly connected to said horizontal bar means at an intermediate point thereof, said sleeve means arranged to slideably support a sight rod in a direction transverse to said long axis;
   C) plumb indicating means removably connected to said sight rod above said sleeve means for indicating vertical position of said rod when supported by said sleeve means in operating position;
   D) plumb adjusting means connected to said sleeve means for adjusting the rod to a true vertical position;
   E) rigid elongate lateral arm means having a distal end, said arm means provided with attaching means for removably attaching to a lower end of said rod, said arm means extending laterally from said attaching means when attached to said rod; and
   F) invert contact means connected to said distal end of said lateral arm means, said invert contact means extending below said lateral arm means, and having a lower portion for contacting said invert, said invert contact means being positioned below all other portions of said instrument when in operating position.

2. The instrument according to claim 1, in which said plumb indicating means includes a bubble level.

3. The instrument according to claim 2, in which said attaching means includes a plurality of apertures in said lateral arm means, said apertures distributed laterally along said lateral arm means for adjusting lateral extent of said lateral arm means when attached.

4. The instrument according to claim 3, in which said plumb adjusting means includes a plurality of radially disposed adjusting screws.

5. The instrument according to claim 4, in which said adjusting screws are provided with spring-loaded tips.

6. The instrument according to claim 4, in which said adjusting screws are disposed in a horizontal plane at a first level of said sleeve means, said sleeve means having a first effective inner diameter at said first level and a smaller effective inner diameter at another level.

7. The instrument according to claim 6, in which said smaller effective inner diameter includes a resilient portion.

8. The instrument according to claim 4, further comprising a sight rod having graduation markings thereon arranged for directly reading the elevation of the invert relative to the manhole.

9. A method of measuring the elevation of the invert of a sewer pipe relative to the top of a manhole, the method comprising the steps of:
   A) laying a horizontal bar across a manhole supporting it upon the upper rim thereof;
   B) connecting a rigid lateral arm, having a distal end, to one end of a sight rod so that the distal end of said arm extends laterally from said rod and below said rod and said arm by a fixed amount when said rod is vertical;
   C) mounting said rod vertically and plumb on said horizontal bar at an intermediate point thereof;
   D) extending said mounted rod downward until said distal end of said arm contacts said invert while said rod remains plumb;
   E) determining the distance between the bottom of said rod at the intersection of said rod and said bar; and
   F) adding said fixed amount to said distance to thereby derive said elevation.

10. The method according to claim 9, in which said elevation is read directly from graduations on said sight, said markings incorporating the steps of determining said distance and adding said amount.

* * * * *